(12) United States Patent
Bylsma et al.

(10) Patent No.: US 6,321,592 B1
(45) Date of Patent: Nov. 27, 2001

(54) METHOD AND APPARATUS FOR CALIBRATING A POSITION SENSOR USED IN ENGINE CONTROL

(75) Inventors: Philip J. Bylsma, Brookfield, WI (US); Paul T. Ng, Vernon Hills, IL (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/193,100

(22) Filed: Nov. 16, 1998

Related U.S. Application Data

(63) Continuation of application No. PCT/US97/10464, filed on Jun. 16, 1997.
(60) Provisional application No. 60/020,955, filed on Jun. 21, 1996.

(51) Int. Cl.[7] ............................. G01L 3/26; G01L 5/13; G01M 15/00
(52) U.S. Cl. ............................................. 73/117.3
(58) Field of Search .................... 73/117.3, 118.2, 73/1.59, 862.38; 123/403, 336; 324/207.24; 360/77; 440/2

(56) References Cited

U.S. PATENT DOCUMENTS

| | | |
|---|---|---|
| 4,570,118 | 2/1986 | Tomczak et al. . |
| 4,586,403 | 5/1986 | Lee et al. . |
| 4,637,361 | 1/1987 | Killen et al. ......................... 123/339 |
| 4,698,996 * | 10/1987 | Kreft et al. ............................ 73/1.79 |
| 4,748,393 * | 5/1988 | Fincher et al. ....................... 318/638 |
| 4,950,988 * | 8/1990 | Garshelis ......................... 324/207.24 |
| 4,974,444 | 12/1990 | Neubacher ............................... 73/118 |
| 5,133,321 | 7/1992 | Hering et al. . |
| 5,157,956 | 10/1992 | Isaji et al. . |
| 5,273,016 * | 12/1993 | Gillespie et al. ..................... 123/403 |
| 5,309,759 | 5/1994 | Marshall ................................ 73/118 |
| 5,314,362 * | 5/1994 | Nagahora ............................... 440/86 |
| 5,321,980 | 6/1994 | Hering et al. . |
| 5,332,965 | 7/1994 | Wolf et al. . |
| 5,438,516 | 8/1995 | Neubauer et al. . |
| 5,445,126 | 8/1995 | Graves, Jr. . |
| 5,497,081 | 3/1996 | Wolf et al. . |
| 5,602,732 * | 2/1997 | Nichols et al. ............... 364/424.034 |

\* cited by examiner

*Primary Examiner*—Benjamin R. Fuller
*Assistant Examiner*—Octavia Davis
(74) *Attorney, Agent, or Firm*—Fletcher, Yoder & Van Someren

(57) ABSTRACT

A system is provided for calibrating a position sensor having a variable output corresponding to the variable position of a movable member. The system establishes, for the position sensor an original assumed output corresponding to a given position of the movable member, establishes for the position sensor a maximum output corresponding to the given position, the maximum output being greater than or equal to the assumed output, establishes for the position sensor a minimum output corresponding to the given position, the minimum output being less than or equal to the assumed output, determines an actual output of the position sensor and, if the actual output is between the maximum output and the minimum output, the system reestablishes the assumed output as being a function of the original assumed output and the actual output.

20 Claims, 4 Drawing Sheets

METHOD AND APPARATUS FOR CALIBRATING A POSITION SENSOR USED IN ENGINE CONTROL

CROSS-REFERENCES TO RELATED APPLICATIONS

This application is a continuation application of copending International Application Serial No. PCT/US97/10464, filed Jun. 16, 1997 claiming the benefit of United States provisional Application Ser. No. 60/020,955, filed Jun. 21, 1996.

BACKGROUND OF THE INVENTION

1. Field of the Invention

The invention relates generally to apparatus and methods for controlling engine operation, and more particularly to apparatus and methods for determining the position of a sensor used for controlling engine operation.

2. Related Prior Art

It is generally known to provide engine control systems including one or more sensors for detecting an engine condition of engine operation and for generating a corresponding control signal used by the control system. An example of such a control system is a throttle control system for an internal combustion engine. Such a system typically includes a throttle lever, a throttle on the engine, and a linkage operably connecting the throttle lever and the throttle. The system may also typically include a throttle position sensor for generating a throttle position control signal used by an electronic control unit (ECU). A throttle position control signal can be used, for example, for determining load demanded by the operator and can relate acceleration and deceleration information to the ECU.

Some such engine control systems may also include a neutral position switch that is operable to indicate the position of the throttle lever in the "neutral" position. This type of switch is commonly used in engine control systems, such as marine applications, wherein the throttle lever position controls both the transmission driven by the engine as well as the throttle.

SUMMARY OF THE INVENTION

In most applications using the above described control systems, the assembly of the control system can entail laborious calibration or synchronization to assure proper correlation between the position of a throttle lever and the throttle lever control signal. Such calibration is necessary to account for variation in performance or sensitivity of the position sensor, the manner in which the sensor is mounted to monitor the throttle lever position.

Recalibration of such an engine control system may also be necessary after a period of engine operation or after control system maintenance or repair. Such calibration is critical to control systems using an ECU and is often performed by skilled personnel.

In one embodiment, the invention provides a method of calibrating a position sensor having a variable output corresponding to the variable position of a movable member, the method comprising the steps of (a) establishing, for the position sensor, an original assumed output corresponding to a given position of the member, (b) establishing, for the position sensor, a maximum output corresponding to the given position, the maximum output being greater than or equal to the assumed output, (c) establishing, for the position sensor, a minimum output corresponding to the given position, the minimum output being less than or equal to the assumed output, (d) determining an actual output of the position sensor, and (e) if the actual output is between the maximum output and the minimum output, reestablishing the assumed output as being a function of the original assumed output and the actual output.

The invention also provides a method of calibrating a position sensor having a variable output corresponding to the variable position of a movable member, the method comprising the steps of (a) establishing, for the position sensor, an original assumed output corresponding to a given position of the member, (b) determining an actual output of the position sensor, and (c) reestablishing the assumed output as being a function of the original assumed output and the actual output.

The invention also provides an apparatus including a position sensor having a variable output corresponding to the variable output of a movable member, and a device for calibrating the position sensor, the device including means for establishing, for the position sensor, an original assumed output corresponding to a given position of the member, means for establishing, for the position sensor, a maximum output corresponding to the given position, the maximum output being greater than or equal to the assumed output, means for establishing, for the position sensor, a minimum output corresponding to the given position, the minimum output being less than or equal to the assumed output, means for determining an actual output of the position sensor, and means operable, when the actual output is between the maximum output and the minimum output, for reestablishing the assumed output as being a function of the original assumed output and the actual output.

The invention also provides an apparatus including a position sensor having a variable output corresponding to the variable position of a movable member, and a device for calibrating the position sensor, the device including means for establishing, for the position sensor, an original assumed output corresponding to a given position of the member, means for determining an actual output of the position sensor, and means operable, when the actual output is between the maximum output and the minimum output, for reestablishing the assumed output as being a function of the original assumed output and the actual output.

The invention also provides an outboard motor including a throttle lever movable between a wide open throttle position and a neutral position, a position sensor having a variable output corresponding to the position of the throttle lever, and a device for calibrating the position sensor, the device including means for establishing, for the position sensor, an original assumed output corresponding to the wide open throttle position of the throttle lever, means for establishing, for the position sensor, a maximum output corresponding to the wide open throttle position of the throttle lever, the maximum output being greater than or equal to the assumed output, means for establishing, for the position sensor, a minimum output corresponding to the wide open throttle position, the minimum output equal to the assumed output, the device also including means for establishing, for the position sensor, an original assumed output corresponding to the neutral position of the throttle lever, means for establishing, for the position sensor, a maximum output corresponding to the neutral throttle position of the throttle lever, the maximum output being equal to the assumed output, means for establishing, for the position sensor, a minimum output corresponding to the neutral throttle position, the minimum output being less than the assumed output, the device also including means for determining an actual output of the position sensor, and means operable, when the actual output is between the maximum output and the minimum output, for reestablishing the assumed output as being a function of the original assumed output and the actual output.

Other features and advantages of the invention will become apparent to those skilled in the art upon review of the following detailed description, claims and drawings.

Figure 1:
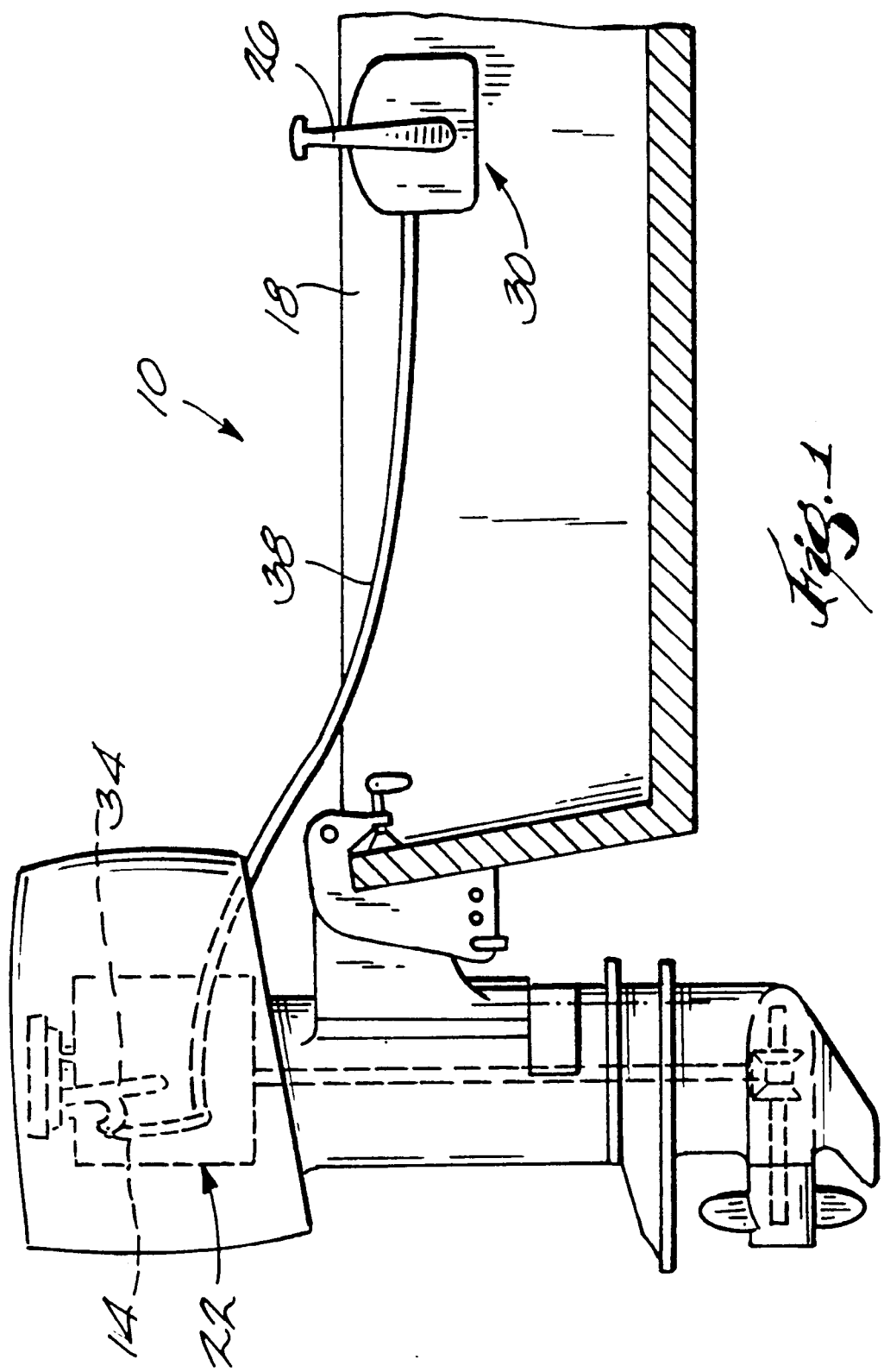
FIG. 1 is a schematic illustration of an engine control system embodying the invention.

Before several embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

The drawings illustrate a system 10 for controlling the operation of an engine 14. While the system 10 is applicable to many different types of engines, in the illustrated embodiment, the system 10 is located on a boat 18 which is driven by an outboard motor 18 including the engine 14.

The system 10 includes a throttle lever 26 that is rotatably supported for movement through a range of positions by a throttle lever housing 26 which is, in turn, fixed to the boat 18. The engine 14 includes a throttle 34 which is operably connected to the throttle lever 26 by means of a throttle linkage 38 and which is also moveable through a range of positions between idle and wide open.

Figure 2:
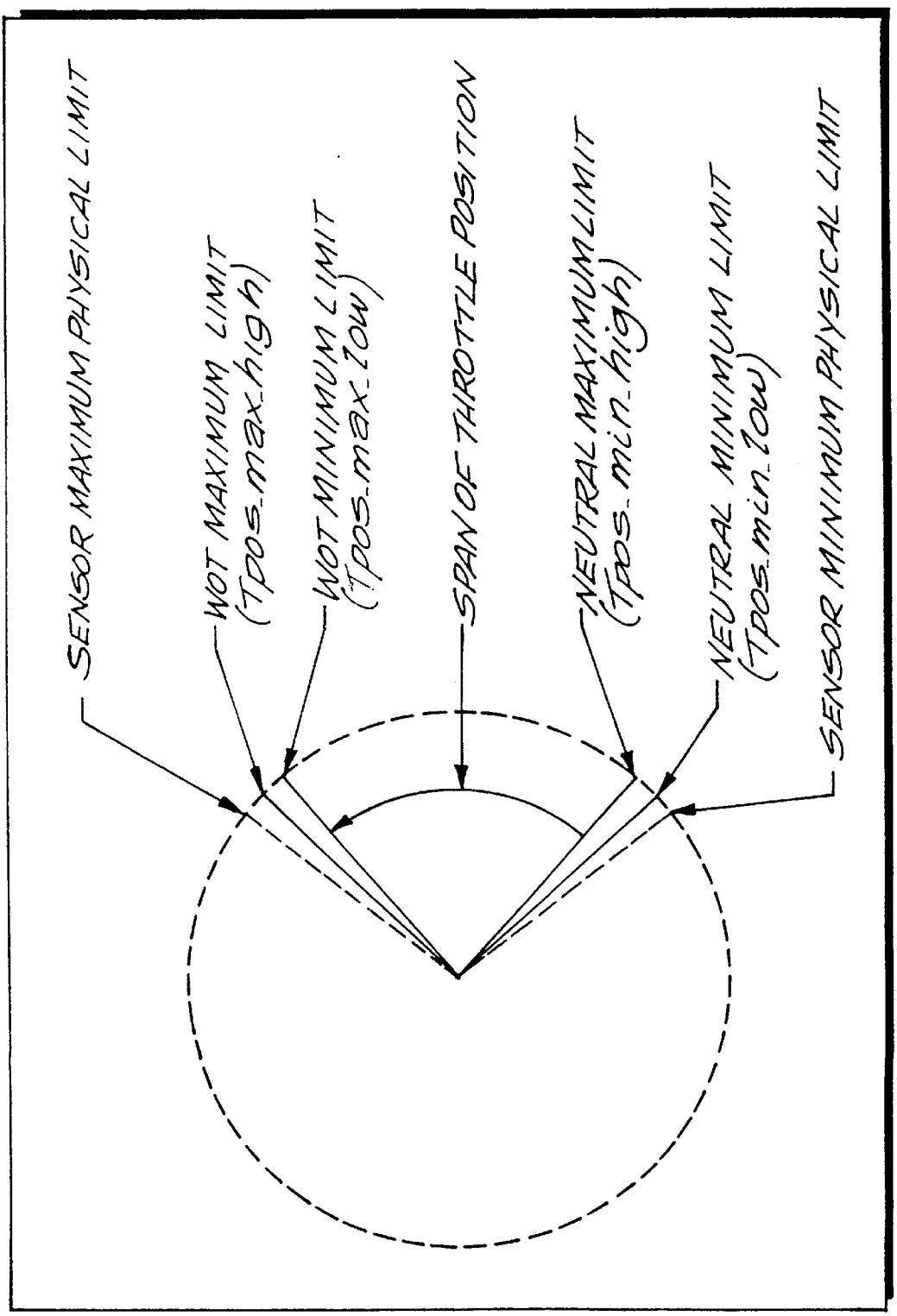
FIG. 2 is a diagram illustrating an operation of the system shown in FIG. 1.

Ideally, when the throttle lever 26 is in a "neutral" position ("N"), the throttle 34 is in its idle position, and when the throttle lever 26 is fully advanced, the throttle 34 is in its wide open throttle position ("WOT"). FIG. 2 illustrates this range of movement of the throttle lever 26 as an arc labeled "span of throttle position".

The system 10 also includes (not shown) a throttle position sensor mounted within the housing for generating a throttle lever position control signal corresponding to the position of the throttle lever 26, and an electronic control unit ("ECU") for receiving control signals, such as the throttle lever position signal, and for controlling engine operating conditions in response to the control signals.

The throttle position sensor has a range of movement which is somewhat greater than the range of movement of the throttle lever 26 so that, if the throttle position sensor is oriented properly with respect to the throttle lever 26, the throttle position sensor effectively generates a corresponding throttle lever position signal over the entire range of possible throttle positions. FIG. 2 illustrates this range of movement of the throttle position sensor as two limits: "sensor minimum physical limit" and "sensor maximum physical limit".

While the range of the throttle position sensor is greater than the range of the throttle lever 26, the excess range of the sensor is only marginal, and the sensor must still be located with care to assure that the full range of throttle positions is covered. If the sensor is not so located, i.e., so that there are throttle lever positions outside the range of the sensor, the system 10 will recognize that condition in a manner discussed below.

The ECU receives the throttle signal position signal, as well as other control signals, and operates to vary engine operating conditions accordingly. The ECU receives the signal position signal in particular and, based upon assumed values of the control signal for the N and WOT positions, calculates the actual position of the throttle lever 26 ("TPOS") and the percent of full load demanded by the operator as indicated by the position of the throttle lever 26. The percent of full load demanded by the operator is used by the ECU in combination with the other control signals to control operation of the engine 14.

More particularly, and with reference to FIGS. 2–4, the ECU operates in the following manner to calibrate the throttle position sensor and to calculate the percentage of full load demanded as indicated by the throttle lever position control signal. The subroutine illustrated by FIG. 4 initiates at Step 50. Upon initiation, the ECU assumes two ranges of possible N and WOT positions (see FIG. 2): the assumed range of the N position lies between values TPOS_min_high and TPOS_min_low (indicated as Zone A in FIG. 3); and the assumed range of the WOT position lies between TPOS_max_high and TPOS_max_low (indicated as Zone C in FIG. 3). The ECU also assumes two values corresponding to WOT and N: TPOS_min is the assumed N position; and has an initial value of TPOS_min_high, and TPOS_max is the assumed WOT position value equal to the value of TPOS_max_low.

These ranges of values assumed by the ECU are assumed upon the beginning of every engine operating session, and the specific values for these ranges are selected based upon several factors which will vary with the specific application of the system 10. For example, the nature and quality, and consistency of performance characteristic of the throttle position sensor used, the manner of holding the sensor relative to the throttle lever 26, and the precision of the assembly process of the throttle housing will all affect the selection of the range of values assumed for the N and WOT positions.

Figure 3:
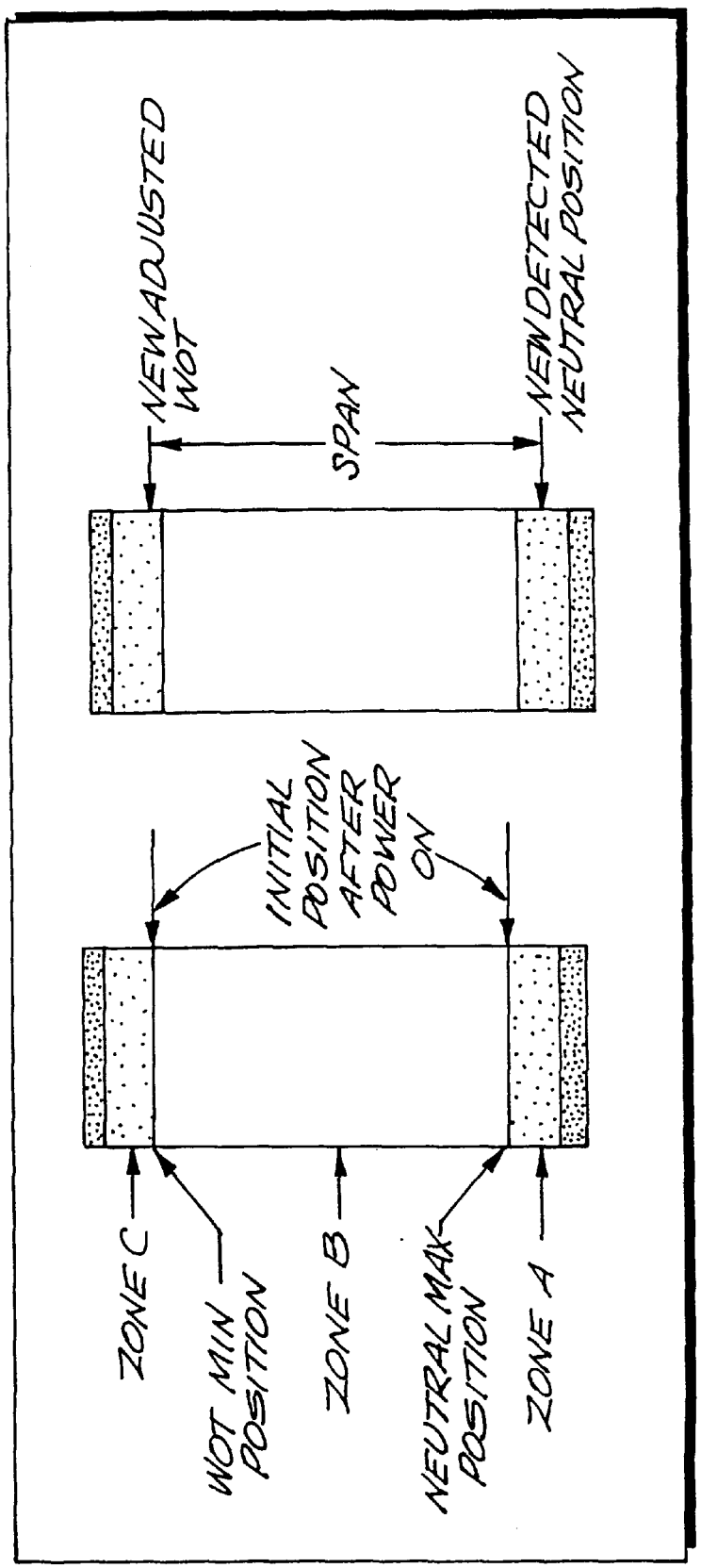
FIG. 3 is a diagram illustrating operation of the control system shown in FIG. 1.
Figure 4:
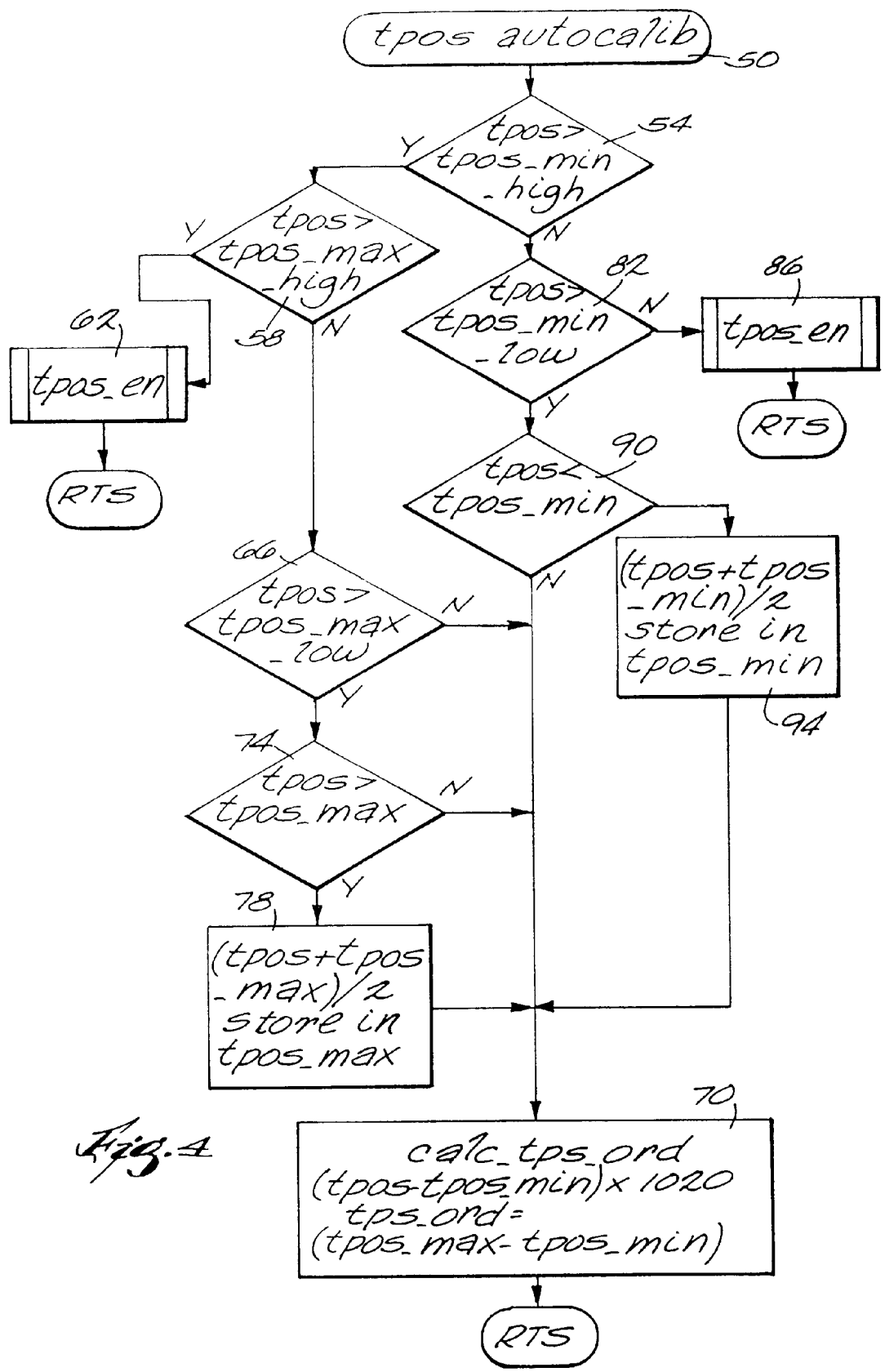
FIG. 4 is a logic diagram setting forth the operation of the system shown in FIG. 1.

The ECU then starts the subroutine shown in FIG. 4 by encountering the first decision block 54 wherein the value of the throttle position control signal, which corresponds to the throttle lever position ("TPOS") is compared with the assumed range of values for the neutral position. More particularly, the TPOS value is compared to the assumed value for TPOS_min_high, i.e, the upper extent of Zone A in FIG. 3. If the value of the throttle position control signal TPOS is greater than TPOS_min_high, this indicates that TPOS is greater than the assumed range for the N position, and the ECU then moves to decision block 58 to compare the value of TPOS with the assumed range of values for the WOT position.

At decision block 58, the value of TPOS is compared with the assumed value for TPOS_max_high, i.e, the upper extent of Zone C in FIG. 3. If the value of TPOS is not equal to or less than TPOS_max_high, which is an unexpected occurrence, then the subroutine terminates at block 62 and the ECU will initiate a diagnostic subroutine.

If, at block 58, the value of TPOS is less than TPOS_max_high, the ECU will compare TPOS with TPOS_max_low, i.e., the lower extent of Zone C at decision block 66 to thereby determine if the value of TPOS is in the assumed range for WOT. If not, the value of TPOS is between the assumed ranges for N and WOT, and the ECU moves to block 70 described in greater detail below. If, at block 66, TPOS is greater than TPOS_max_low, an indication that the value of TPOS is in the range of Zone C, then the ECU will move to block 74 to compare TPOS with the assumed value for TPOS_max.

If the value of TPOS is less than TPOS_max, the ECU moves to block 70. If the value of TPOS is greater than TPOS_max, then the ECU moves to block 78 and recalculates TPOS_max as a function of TPOS and the assumed value of TPOS_max. In particular, at block 78, the value for TPOS_max is recalculated as the average of the previous value of TPOS_max the current or actual value of TPOS.

The ECU then moves to block 70.

If, however, at block 54 the value of TPOS is not greater than the assumed value of the N position, i.e., TPOS_min_high, the ECU moves to block 82 and compares the value of TPOS with the lower extent of Zone A, i.e., the value of TPOS_min_low.

Similar to the calculation at block 58, if at block 82 the value of TPOS is outside the assumed range of values for the N position (is not greater than or equal to TPOS_min_low) the subroutine is terminated at block 86 and the ECU initiates a diagnostic subroutine.

On the other hand, if at block 82 the value of TPOS is greater than TPOS_min_low, then the ECU moves to block 90 and compares the value of TPOS with the assumed value of TPOS_min, which is initially assumed to be equal to TPOS_min_high. If TPOS is not less than TPOS_min, then the ECU moves to block 70. If TPOS is less than TPOS_min, then the ECU moves to block 94 and recalculates TPOS_min as a function of the previous value of TPOS_min and the current value of TPOS.

In particular, at block 94, the value for TPOS_min is recalculated as the average of the previous value of TPOS_min the current or actual value of TPOS. The ECU then moves to block 70.

At block 70, the ECU calculates the percentage of full load demanded by the operator (TPOS_ord) as indicated by the position of the throttle lever 26, which corresponds to the value of TPOS, and the relative value of TPOS to the range between N and WOT, which respectively correspond to the calculated values for TPOS_min and TPOS_max. This percentage is then multiplied by a constant, the integer 1020 in block 70, used by the ECU as indicating full power.

More particularly, the value of TPOS_min (the value for N position) is subtracted from the value for TPOS and is used as a numerator. The denominator used in the difference between TPOS_min and TPOS_max. Thus, for example, if the current value of TPOS is equal to TPOS_max, an indication that the throttle 34 is at WOT, then the value of TPOS_ord is 1020 (1×1020). Similarly, if the current value of TPOS is equal to TPOS_min, then the value of TPOS_ord is 0 (0×1020).

Upon the calculation of TPOS_ord, ECU exits the subroutine shown in FIG. 4.

Other features and advantages of the invention are set forth in the following claims.

What is claimed is:

1. A method of calibrating a position sensor for a movable member, the position sensor having a variable output corresponding to a range of motion of the movable member, said method comprising the acts of:
    establishing, for the position sensor, a first output corresponding to a first given position of the movable member;
    establishing, for the position sensor, a maximum output corresponding to the first given position, the maximum output being greater than or equal to the first output;
    establishing, for the position sensor, a minimum output corresponding to the first given position, the minimum output being less than or equal to the first output;
    determining an actual output of the position sensor;
    if the actual output is between the maximum output and the minimum output, reestablishing the first output as a function of the first output and the actual output; and
    establishing an actual position of the movable member as a function of the actual output and the first output.

2. A method as set forth in claim 1, comprising:
    reestablishing the first output as a function of the first output and the actual output if the actual output is between the minimum output and the first output.

3. A method as set forth in claim 1, the first output being reestablished as an average of the first output and the actual output.

4. A method as set forth in claim 1, comprising:
    positioning the movable member to a second given position;
    establishing, for the position sensor, a second output corresponding to the second given position of the movable member;
    establishing, for the position sensor, a second maximum output corresponding to the second given position, the second maximum output being greater than or equal to the second output;
    establishing, for the position sensor, a second minimum output corresponding to the second given position, the second minimum output being less than or equal to the second output;
    determining an actual output of the position sensor; and
    if the actual output is between the second maximum output and the second minimum output, reestablishing the second output as a function of the second output and the actual output; and
    establishing the actual position of the movable member as a function of the actual output, the first output, and the second output.

5. A method as set forth in claim 4, comprising:
    reestablishing the second output as a function of the second output and the actual value if the actual output is between the maximum output and the second output.

6. A method as set forth in claim 4, the second output being reestablished as an average of the second output and the actual output.

7. A method of calibrating a position sensor for a movable member, the position sensor having a variable output corresponding to a range of motion of the movable member, said method comprising the acts of:
    establishing, for the position sensor, an initial value for an output corresponding to a first given position of the movable member;
    determining an actual output of the position sensor; and
    establishing an updated value for the output corresponding to the first given position of the movable member, the updated value being a function of the initial value and the actual output.

8. A method as set forth in claim 7, the updated value being between the initial value and the actual output.

9. A method as set forth in claim 8, the updated value being an average of the initial value and the actual output.

10. A method as set forth in claim 7, comprising:
    positioning, the movable member to a second given position;
    establishing, for the position sensor, a second initial value corresponding to the second given position of the movable member;
    determining an actual output of the position sensor, and
    establishing an updated value for the output corresponding to the second given position of the movable member, the updated value being a function of the second initial value and the actual output.

11. A method as set forth in claim 10, the updated value for the output corresponding to the second given position of the movable member being between the second initial value and the actual output.

12. A method as set forth in claim 11, the updated value for the output corresponding to the second given position of the movable member being an average of the second initial value and the actual output.

13. An apparatus comprising a position sensor for a movable member, the position sensor having a variable output throughout a range of motion of the movable member, and a device for calibrating the position sensor, the device including:
    means for establishing, for the position sensor, a first output corresponding to a first given position of the movable member;
    means for establishing, for the position sensor, a first maximum output corresponding to the first given position, the first maximum output being greater than or equal to the first output;
    means for establishing, for the position sensor, a first minimum output corresponding to the first given position, the minimum output being less than or equal to the first output;
    means for determining an actual output of the position sensor; and
    means operable, when the actual output is between the first maximum output and the first minimum output, for reestablishing the first output as a function of the first output and the actual output.

14. An apparatus comprising a position sensor having an output corresponding to a position of a movable member, and a device for calibrating the position sensor, the device including:
    means for establishing, for the position sensor, an assumed output corresponding to a given position of the movable member,
    means for determining an actual output of the position sensor,
    means operable, when the actual output is between the maximum output and the minimum output, for establishing a first output corresponding to the given position of the movable member, the first output being a function of the assumed output and the actual output; and
    means for producing an output signal corresponding to an actual position of the movable member as a function of the actual output and the first output.

15. An outboard motor comprising:
    a throttle lever movable between a wide open throttle position and a neutral position,
    a position sensor having an output corresponding to a position of the throttle lever, and
    a device for calibrating the position sensor, the device being configured for
    establishing, for the position sensor, a first output corresponding to a wide open throttle position of the throttle lever;
    establishing, for the position sensor, a first maximum output corresponding to the wide open throttle position of the throttle lever, the first maximum output being greater than or equal to the first output;
    establishing, for the position sensor, a first minimum output corresponding to the wide open throttle position, the first minimum output being less than or equal to the first output;
    establishing, for the position sensor, a second output corresponding to a neutral position of the throttle lever,
    establishing, for the position sensor, a second maximum output corresponding to the neutral throttle position of the throttle lever, the second maximum output being greater than or equal to the second output;
    establishing, for the position sensor, a second minimum output corresponding to the neutral throttle position, the second minimum output being less than or equal to the second output;
    determining an actual output of the position sensor;
    reestablishing the first output when the actual output is between the first maximum output and the first minimum output as a function of the first output and the actual output, or
    reestablishing the second output when the actual output is between the second maximum output and the second minimum output as a function of the second output and the actual output.

16. The method as recited in claim 4, wherein an output corresponding to a percentage of throttle position is established, the percentage of throttle position being a function of a difference between the actual output and the first ouput and a difference between the second output and the first output.

17. The method as recited in claim 1, wherein if the actual output is between the maximum output corresponding to the given position of the movable member and the minimum output corresponding to the given position of the movable member, the first output corresponding to the given position of the movable member is updated by a function of the actual output and the first output.

18. The method as recited in claim 4, wherein if the actual output is between the maximum output corresponding to the second given position of the movable member and the minimum output corresponding to the second given position of the movable member, the second output corresponding to the second given position of the movable member is updated by a function of the actual output and the second output.

19. The apparatus of claim 13, the device for calibrating the position sensor being configured for
    positioning the movable member to a second given position;
    establishing, for the position sensor, a second output corresponding to the second given position of the movable member;
    establishing, for the position sensor, a second maximum output corresponding to the second given position, the second maximum output being greater than or equal to the second output;
    establishing, for the position sensor, a second minimum output corresponding to the second given position, the minimum output being less than or equal to the second output;
    determining an actual output of the position sensor, and
    operable, when the actual output is between the second maximum output and the second minimum output, for reestablishing the second output as a function of the second output and the actual output.

20. The apparatus of claim 15, wherein the apparatus provides an output corresponding to a percentage of throttle position, the percentage of throttle position being a function of a difference between the actual output and the first ouput and a difference between the second output and the first output.

* * * * *